US012027289B2

(12) United States Patent
Baeck

(10) Patent No.: US 12,027,289 B2
(45) Date of Patent: Jul. 2, 2024

(54) POWER UNIT AND POWER CABLE FOR MOBILE COMMUNICATION BASE STATION

(71) Applicant: LS CABLE & SYSTEM LTD., Anyang-si (KR)

(72) Inventor: Jong Seb Baeck, Anyang-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 42 days.

(21) Appl. No.: 17/602,591

(22) PCT Filed: May 20, 2020

(86) PCT No.: PCT/KR2020/006564

§ 371 (c)(1),
(2) Date: Oct. 8, 2021

(87) PCT Pub. No.: WO2020/235923

PCT Pub. Date: Nov. 26, 2020

(65) Prior Publication Data

US 2022/0208417 A1 Jun. 30, 2022

(30) Foreign Application Priority Data

May 19, 2019 (KR) ........................ 10-2020-0059597
May 20, 2019 (KR) ........................ 10-2019-0058920

(51) Int. Cl.
*H01B 9/02* (2006.01)
*H01B 9/00* (2006.01)

(52) U.S. Cl.
CPC ............ *H01B 9/003* (2013.01); *H01B 9/008* (2013.01); *H01B 9/024* (2013.01)

(58) Field of Classification Search
CPC ............ H01B 5/08; H01B 9/02; H01B 9/025
See application file for complete search history.

(56) References Cited

U.S. PATENT DOCUMENTS 6,023,026 A * 2/2000 Funahashi ............. D07B 5/007 174/128.1
8,933,330 B2 * 1/2015 Hayashishita ....... H01B 7/0009 174/28

(Continued)

FOREIGN PATENT DOCUMENTS

CN 204667937 U 9/2015
JP 11-120836 * 4/1999

(Continued)

OTHER PUBLICATIONS

International Search Report for related International Application No. PCT/KR2020/006564; report Nov. 26, 2020; (5 pages).

(Continued)

*Primary Examiner* — Chau N Nguyen
(74) *Attorney, Agent, or Firm* — K&L Gates LLP

(57) ABSTRACT

The present disclosure relates to a power unit and a power cable for a mobile communication base station, which have sufficiently low inductance and thus minimize voltage oscillation regardless of a change of the amount of power transmitted when communication load of a mobile communication base station increases, thereby providing stable communication services, and which enhance workability of connection to a remote radio unit (RRU) at a base station.

19 Claims, 6 Drawing Sheets

(56) References Cited

U.S. PATENT DOCUMENTS

| | | | | |
|---|---|---|---|---|
| 9,748,020 | B2 * | 8/2017 | Oshima | H01B 7/0009 |
| 2010/0038112 | A1 * | 2/2010 | Grether | D07B 1/0693 174/128.1 |
| 2016/0293292 | A1 * | 10/2016 | Oshima | H01B 7/0009 |
| 2019/0248308 | A1 * | 8/2019 | Hayakawa | H01B 7/041 |
| 2020/0099203 | A1 * | 3/2020 | Pabst | H01B 7/185 |
| 2020/0161027 | A1 * | 5/2020 | Saeki | H01B 13/0006 |

FOREIGN PATENT DOCUMENTS

| | | | | |
|---|---|---|---|---|
| JP | 3795203 | B2 | | 7/2006 |
| JP | 2010-129180 | | * | 6/2010 |
| JP | 2018117919 | A | | 8/2018 |
| KR | 1020150078265 | A | | 8/2015 |
| KR | 20170035669 | A | | 3/2017 |

OTHER PUBLICATIONS

Written Opinion for related International Application No. PCT/KR2020/006564; report Nov. 26, 2020; (6 pages).

* cited by examiner

POWER UNIT AND POWER CABLE FOR MOBILE COMMUNICATION BASE STATION

CROSS-REFERENCE TO RELATED APPLICATIONS

The present application is a National Stage of International Application No. PCT/KR2020/006564 filed on May 20, 2020, which claims the benefit of Korean Patent Application No. 10-2019-0058920, filed on May 20, 2019, and Korean Patent Application No. 10-2020-0059597 filed on May 19, 2019, filed with the Korean Intellectual Property Office, the entire contents of each hereby incorporated by reference.

FIELD

The present disclosure relates to a power unit for a mobile communication base station and a power cable including the same. More specifically, the present disclosure relates to a power unit and a power cable for a mobile communication base station, which have sufficiently low inductance and thus minimize voltage oscillation regardless of a change of the amount of power transmitted when communication load of a mobile communication base station increases, thereby providing stable communication services, and which enhance workability of connection to a remote radio unit (RRU) at a base station.

BACKGROUND

In the case of a mobile communication system of the related art, a communication signal is transmitted to a base station from a backbone station of a communication carrier or the like, and a radio-frequency (RF) signal transmitted from a base transceiver station (BTS) of the base station is wirelessly transmitted through an antenna of the base station. A radio signal transmitted from a user's portable terminal is received through the antenna of the base station, amplified through a tower mounted amplifier (TMA), and thereafter transmitted to the BTS.

In this case, the BTS, the TMA, and the antenna of the base station are connected through a coaxial feeder line but as the length of the coaxial feeder line is increased, a signal loss increases. When the antenna is installed on a base station tower of a height of dozens of meters, a signal loss may increase in the axial feeder line connecting the base station on the ground and the antenna and thus a signal provided from the base station may not reach the intensity of signal required at the antenna but attenuates due to the signal loss. Thus, the TMA is installed to compensate for the signal loss and amplify the signal.

However, the TMA consumes a relatively large amount of power to amplify the signal and thus high maintenance costs are incurred in terms of an entire system, thus reducing efficiency.

As FTTx (Fiber to the X) has advanced and the sizes of relay devices are becoming smaller, base station facilities are being developed. A signal attenuation versus the length of a cable is low compared to an optical cable and a coaxial cable. A remote radio unit (RRU) method (or a remote radio head method), which is a technique for transmitting an optical signal immediately before an antenna of a base station to minimize a signal loss and converting the optical signal into an RF signal to be emitted before the antenna, has been developed by applying the above advantages.

The RRU method may compensate for disadvantages of a mobile communication base station using a TMA of the related art in terms of power consumption and maintenance inefficiency. In a base station system employing the RRU method, an RRU is separated from a general BTS base station system, installed below a remote antenna, and remotely controlled.

Therefore, a baseband unit and a power supply unit of the BTS system from which the RRU is separated supply wireless communication data and power to the RRU installed near an antenna of a base station tower and connected to the antenna through a coaxial feeder line.

Therefore, in the base station employing the RRU method, a power cable and an optical cable may be used or a single cable may be used if necessary to supply power and data to the RRU near antenna from the baseband unit and the power supply unit on the ground or the like.

In this case, a method of connecting the optical cable or the power cable to a terminal box installed at the base station tower through a single power cable, and connecting part split from the optical cable (hereinafter referred to as an "optical unit") or part split from the power cable (hereinafter referred to as a "power unit") through the terminal box to the RRU may be used.

In the case of base stations of mobile communication, such as 5G, which has recently come into widespread use, there is a trend to form a small network with small and dense coverage due to propagation characteristics, etc., unlike in the related art.

When communication load increases sharply in a coverage area covered by a specific base station system, the amount of power to be supplied to each RRU and the like should be quickly increased within a maximum output.

In this case, when the amount of current supplied through a power cable or a power unit connecting a power supply unit and an RRU increases, instantaneous voltage oscillation may occur due to inductance of the power cable or the power unit and thus the communication system may be down or paralyzed.

To prevent such instantaneous voltage oscillation, the inductance of the power cable or the power unit used in the mobile communication base station should be reduced.

In addition to a configuration for reducing the inductance of the power cable or the power unit, power units split from the power cable are connected to RRUs at the base station tower and thus workability of the connection should be considered.

SUMMARY

The present disclosure is directed to providing a power unit and a power cable for a mobile communication base station, which have sufficiently low inductance and thus minimize voltage oscillation regardless of a change of the amount of power transmitted when communication load of a mobile communication base station increases, thereby providing stable communication services, and which enhance workability of connection to a remote radio unit (RRU) at a base station.

According to an aspect of the present disclosure, there is provided a power unit comprising: an inner conductor including a plurality of conductive strands; an inner insulating layer configured to insulate the inner conductor; an outer conductor including a plurality of conductive strands formed in multiple layers outside the inner insulating layer and wound spirally in a direction; and an outer insulating layer configured to insulate the outer conductor, wherein the inner conductor and the outer conductor are formed coaxially to be used as a pair of conductors for supplying direct-current (DC) power, and a ratio between the sum of areas of the strands of the inner conductor and the sum of areas of the strands of the outer conductor is 0.625:1.6.

And the power unit may be connected to a remote radio unit (RRU) deployed on the tower so as to supply power from a power supply unit (PSU) on the ground to the RRU in a base station system employing a remote radio head (RRH).

And the inner conductor of the power unit may comprise a multiply twisted conductor manufactured by twisting a plurality of strands to form first twisted strands with a first twist pitch and twisting a plurality of first twisted strands to form second twisted strands with a second twist pitch.

And the multiply twisted conductor may comprise a center first twisted strand and first twisted strands arranged around the center first twisted strand and twisted in a direction opposite to a direction in which the center first twisted strand is twisted, and a direction in which the first twisted strands may be helically bound is the same as the direction in which the center first twisted strand is twisted.

And the first twist pitch of the first twisted strands of the power unit may be less than the second twist pitch of the multiply twisted conductor.

And strands constituting the first twisted strands of the power unit may have a diameter of 31 AWG to 33 AWG, wherein each of the first twisted strands may include thirty to fifty strands.

And the multiply twisted conductor has a (1+N) structure in which a center first twisted strand may be arranged at a center and N outer center strands may be arranged around the center first twisted strand and thus has an outer diameter of 5 AWG to 7 AWG, wherein N is 5, 6 or 7.

And strands constituting the outer conductor may have an outer diameter of 31 AWG to 33 AWG, and are formed in one to five layers and wound spirally in the same direction, and the sum of areas of the strands of the outer conductor may be in a range of 5 AWG to 7 AWG.

And the outer conductor may be formed by stacking a plurality of conductive strands while being wound spirally in one direction, and spiral-winding pitches of the layers of the outer conductor may decrease from inside to outside so as to prevent the strands of the layers from loosening.

And the direction in which the outer conductor may wound spirally may be opposite to the direction in which the multiply twisted conductor may be helically bound.

And a ratio between the sum of areas of the strands of the inner conductor and the sum of areas of the strands of the outer conductor may be substantially the same as 1:1.

And the inner conductor may be used as a positive electrode of a direct-current (DC) voltage source, and the outer conductor may be used as a negative electrode of the DC voltage source.

And a space factor of the strands of the inner conductor relative to an inner space of the inner insulating layer may be 60% or more.

And according to an aspect of the present disclosure, there is provided a power cable comprising: a plurality of power units mentioned above; and a cable jacket covering the plurality of power units.

And the power cable may supply power to a remote radio unit (RRU) deployed on the tower from a power supply unit (PSU) on the ground in a base station system employing a remote radio head (RRH).

And the power cable may be connected to a terminal box from the PSU and may be split into the plurality of power units through the terminal box to be connected to a plurality of RRUs.

And the power cable may further comprise at least one interposition unit.

And the power cable may further comprise a communication unit including at least one twisted pair of conductor lines insulated with an insulating layer.

And the power cable may further comprise an optical unit including at least one optical fiber.

And the power cable may further comprise at least one ripcord included in the cable jacket.

And according to an aspect of the present disclosure, a remote radio head (RRH) base station system comprising: a power supply unit (PSU), which is ground equipment for supplying power to a remote radio unit (RRU) deployed on the base station tower of the RRH base station system; the RRU connected to the antenna through a coaxial feeder line, connected to a baseband unit (BBU), which is ground equipment of the RRH base station system, and configured to convert a radio-frequency (RF) signal; and a power cable configured to supply power between the PSU and the RRU, the power cable including a plurality of power units of any one of claims 1 to 13 and a cable jacket covering the plurality of power units.

And the power cable may be connected to a terminal box from the PSU and is split into the plurality of power units through the terminal box to be connected to a plurality of RRUs.

According to a power unit for a mobile communication base station and a power cable including the same according to the present disclosure, a power unit formed in the form of a coaxial cable and a power cable including the same are provided to minimize voltage oscillation due to sufficiently low inductance regardless of a change of the amount of power transmitted when communication load of a mobile communication base station increases.

In addition, according to the power unit for a mobile communication base station and the power cable including the same according to the present disclosure, when an outer conductor of the power unit of the power cable is configured as a wound spirally layer and connected to a remote radio unit (RRU) at a base station, an inner insulating layer and an outer insulating layer may be removed and an inner conductor and an outer conductor may be connected to the RRU in the same manner as in a stranded conductor of a general cable, thereby increasing workability of connection at the tower of the base station.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

Figure 1:
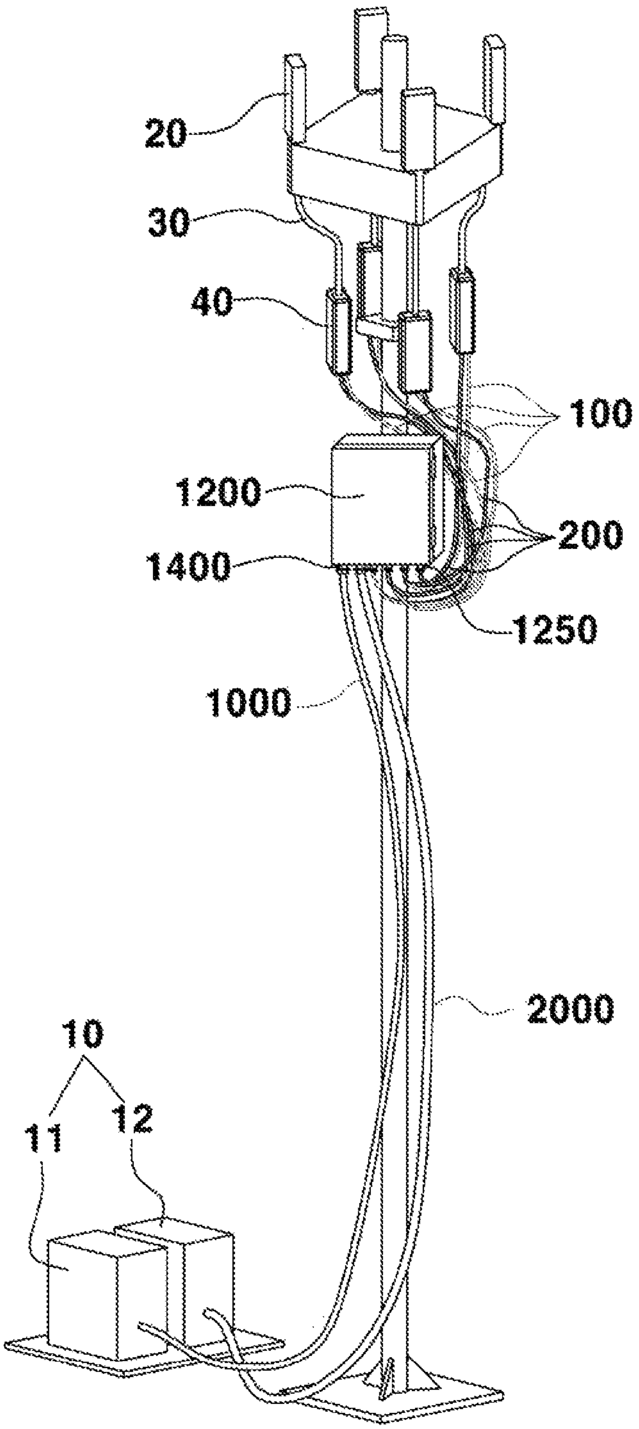
FIG. 1 illustrates a base station system, which employs a remote radio unit (RRU) method and to which a power unit and a power cable including the power unit according to the present disclosure are applicable.

FIG. 1 illustrates a base station system, which employs a remote radio unit (RRU) method and to which a power unit and a power cable including the power unit according to the present disclosure are applicable.

The base station system employing the RRU method of the present disclosure includes part 10, i.e., a baseband unit 11 and a power supply unit 12, of a base station system of the related art employing a base transceiver station (BTS) method, excluding an RRU and the like; and a base station tower may include an antenna 20, a plurality of RRUs 40 connected to the antenna 20 through a coaxial feeder line 40, and a terminal box 1200 connected to the RRUs 40 through an optical unit and a power unit.

The baseband unit 11 and the power supply unit 12, which are located on the ground, may be connected to the terminal box 1200 through an optical cable 1000 and a power cable 2000, respectively.

More particularly, in the base station system of the present disclosure employing the RRU method, the baseband unit 11 and the terminal box 1200 may be connected through the optical cable 1000, and the optical cable 1000 may be split into optical units 100 in the terminal box 1200 and each of the optical units 100 may be connected to one of the RRUs 40, and similarly, the power supply unit 12 and the terminal box 1200 may be connected through the power cable 2000, and the power cable 1000 may be split into power units 200 and each of the power units 200 may be connected to one of the RRUs 40, thereby providing the RRUs 40 with power and a communication function.

Here, the optical cable 1000 and the power cable 2000 may be configured as a single optical fiber and power line composite cable, and the optical unit 100 and the power unit 200 may be configured as a single jumper cable or the like.

Because the RRU 40 may be installed at the top of the base station tower and directly below the antenna 20, the length of the coaxial feeder line 30 for supplying a radio-frequency (RF) signal obtained through conversion by the RRU 40 to the antenna 20 may be minimized, thus preventing attenuation of the RF signal when transmitted through the coaxial feeder line 30. Thus, attenuation of a signal before emitted may be minimized and a TMA consuming a large amount of power is not necessary. The above technical features are features and advantages of the base station system employing the RRU method in terms of maintenance of a base station.

In mobile communications after recent 4th generation mobile communication, orthogonal frequency-division multiplexing (OFDM) is generally used.

In CDMA, data including millions of bits is transmitted in a frequency and thus increasing a data transmission rate is limited.

As the number of bits increases, a bit time decreases and information is likely to be lost due to external noise, etc. Thus, an OFDM scheme of dividing and transmitting data in multiple frequencies has become a core technique of wireless communications after 4G.

In the OFDM scheme, data is divided and transmitted in multiple frequencies having orthogonality rather than a signal having a wide bandwidth as a carrier wave in CDMA, thus fixing difficulties in creating bits within a short time and eliminating influences due to noise.

The data divided and transmitted in multiple frequencies according to the OFDM scheme may be combined and transmitted, and received by collecting and combining data corresponding to each of the frequencies, thereby identifying the original data. The OFDM scheme is different from general frequency multiplexing (FDM) in that frequencies are overlapped and used to achieve orthogonality between the frequencies, thereby maximizing frequency efficiency.

Despite the above many advantages, the OFDM scheme has a higher peak-to-average power ratio (PAPR) than that of a single carrier modulation (SCM) system and may cause many changes in power to be transmitted, thereby reducing power efficiency.

In addition, when many communication loads occur suddenly in a small network, the system may be down or communication may be interrupted due to voltage oscillation due to inductance of the power cable 2000 or the power unit 200 and thus the present disclosure has been derived to solve this problem. This will be described in detail with reference to FIG. 2 below.

Figure 2:
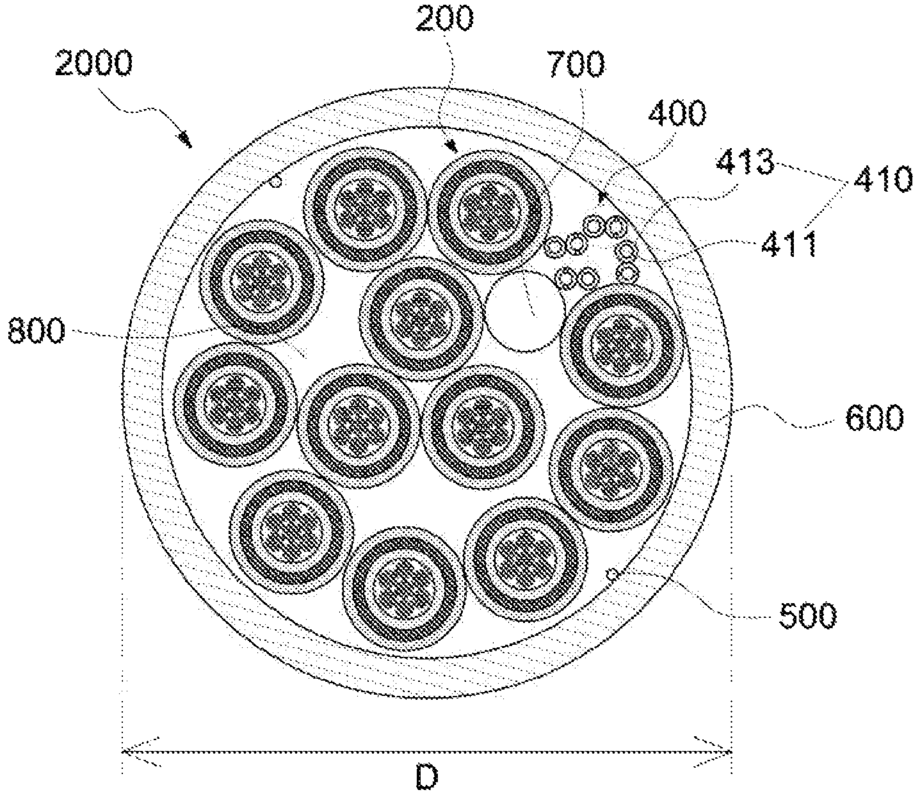
FIG. 2 and FIG. 2B illustrate cross-sectional views of power cables for a mobile communication base station according to embodiments of the present invention.

FIG. 2 illustrates a cross-sectional view of a power cable 2000 for a mobile communication base station according to an embodiment of the present disclosure.

As shown in FIG. 2, a power cable 2000 for a mobile communication base station according to the present disclosure may include a plurality of power units 200 and a cable jacket layer 600 surrounding the plurality of power units 200.

The power cable 2000 of FIG. 2 includes a total of twelve power units 200 to supply direct-current (DC) power to a total of twelve RRUs.

That is, one power unit 200 may be configured to correspond to one RRU. A structure of each of the power units 200 will be described below.

At least one interposition unit 700 may be further provided to reinforce tensile strength of the power cable 2000 or maintain a round shape of the power cable 2000, and an empty space between the power units 200 may be filled with a filler formed of a material such as a fiber to reinforce waterproof performance or tensile strength.

At least one ripcord 500 or the like may be provided inside the cable jacket layer 600 covering the plurality of power units 200 so as to strip the cable jacket layer 600 at a site.

The cable jacket layer 600 may be formed of a PVC material with excellent ultraviolet blocking performance or the like for outdoor installation. When an outer diameter of each of the power units 200 is about 10 mm and approximately twelve power units 200 are provided, an outer diameter D of the power cable 2000 may be set to be in a range of 40 mm to 50 mm to stably supply power to approximately twelve RRUs or the like installed at a tower.

As shown in FIG. 2, the power cable 2000 of the present disclosure includes a communication unit 400 including twisted pairs of conductor lines 411 covered with an insulating layer 413 to transmit or receive a control signal, a sensor signal, etc. to or from an RRU, etc.

Figure 2B:
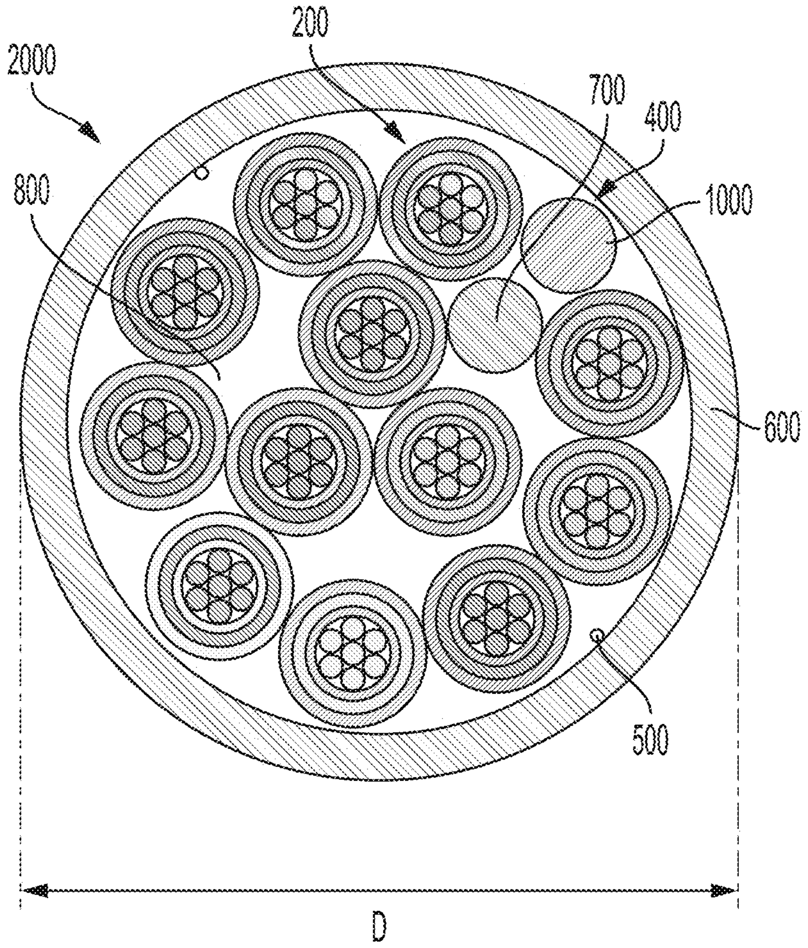

The communication unit 400 is illustrated as including four twisted pairs of conductor lines 410, but the number of twisted pairs of conductor lines 410 may be variable and the communication unit 400 may be configured in the form of an optical cable 1000, as is shown in FIG. 2B.

As described above with reference to FIG. 1, in the base station system employing the RRU method, the baseband unit 11, which is a ground device, and the terminal box 1200 may be connected through the optical cable 1000 and the optical cable 1000 may be split into the optical units 100 in the terminal box 1200 and connected to the RRUs 40, and the power supply unit 12, which is a ground device, and the terminal box 1200 may be connected through the power cable 2000 and the power cable 2000 may be split into the power units 200 in the terminal box 1200 and connected to the RRUs 40, but the power supply unit 12 and the baseband unit 11 may be connected to the terminal box 1200 through a single optical fiber and power line composite cable.

Figure 3:
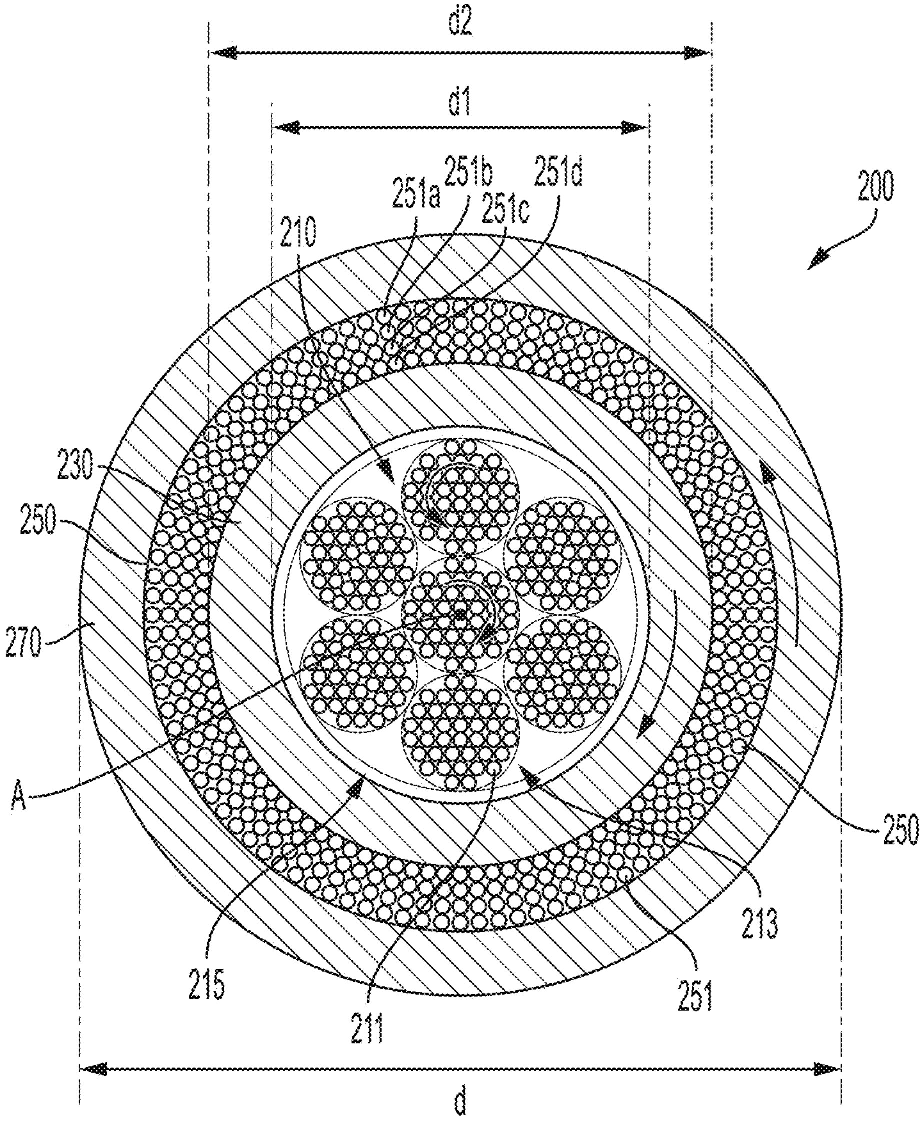
FIG. 3 and FIG. 3B are enlarged cross-sectional views of a power unit of a power cable for a mobile communication base station illustrated in FIG. 2 or FIG. 2B taken at different positions along the length of the power cable.

FIG. 3 is an enlarged cross-sectional view of a power unit 200 included in the power cable 2000 for a mobile communication base station illustrated in FIG. 2.

The power unit 200 according to the present disclosure includes an inner conductor 210 including a plurality of conductive strands; an inner insulating layer 230 for insulating the inner conductor 210; an outer conductor 250 including a plurality of conductive strands formed in multiple layers outside the inner insulating layer 230 and wound spirally in a direction; and an outer insulating layer 270 for insulating the outer conductor 250, wherein the inner conductor 210 and the outer conductor 250 are formed coaxially to be used as a pair of conductors for supplying DC power, and a ratio between the sum of areas of the strands of the inner conductor 210 and the sum of areas of the strands of the outer conductor 250 may be 0.625:1.6.

According to the present disclosure, in order to prevent voltage oscillation due to a change in current during the supply of power, a pair of conductors for supplying DC power to RRUs are manufactured in a coaxial structure. The coaxial structure refers to a shape in which a central axis A of an inner conductor and a center axis A of an outer conductor are the same.

An inductance of a power unit formed in a coaxial shape is low, because due to a structure in which an inner conductor and an outer conductor disposed coaxially are covered with respect to the same center axis A, a magnitude Bi of a magnetic field generated from current Ii flowing through the inner conductor may be offset and reduced by a magnetic field Bo generated from carrier current Io derived from the magnetic field and flowing through the outer conductor and thus the inductance of the power unit having the coaxial structure may decrease, thereby minimizing voltage oscillation.

That is, in the power unit 200 of the present disclosure, the coaxial structure is applied to the inner conductor 210 and the outer conductor 250, which are a pair of conductors for supplying power, so that the electromagnetic induction due to a change of the amount of current may be minimized to greatly reduce inductance.

In the power unit 200 of the present disclosure, the inner conductor 210 and the outer conductor 250 may have the coaxial structure and consist of fine strands to ensure flexibility and workability for connection. This feature will be described in detail with reference to FIG. 4 below.

The inner conductor 210 provided at the center of the power unit 200 of the present disclosure illustrated in FIG. 3 may include first twisted strands 213 each formed by twisting strands 211 with a first twist pitch.

Alternatively, in the inner conductor 210 of the power unit 200, the strands 211 may be first twisted to form the first twisted strands 213 with the first twist pitch, and through the terminal box may be helically bound to form a multiply (or 'self-twist and second twisted') twisted conductor (or 'second twisted strands') 215 with a second twist pitch.

Specifically, as shown in FIG. 3, the multiply twisted conductor 215 includes: a center first twisted strand 213 at a center; and N outer first twisted strands 213 arranged around the center first twisted strand 213 and twisted in a direction opposite to a direction in which the center first twisted strand 213 is twisted (N is 5, 6 or 7, and N=6 in FIG. 3), wherein a direction in which the first twisted strands 213 are helically bound is the same as the direction in which the center first twisted strand 213 is twisted or is opposite to the direction in which the outer first twisted strands 213 are twisted, thereby minimizing an empty space of a cross section of the inner conductor 210, preventing the strands 211 from loosening, and achieving sufficient flexibility.

That is, the direction of twisting the center first twisted strand 213 may be set to be different from the direction of twisting the outer first twisted strands 213, and the direction of twisting a plurality of first twisted strands 213 may be set to be different from the direction of twisting the outer first twisted strands 213 (in order of S-twist-Z-twist-S-twist or Z-twist-S-twist-Z-twist), and the first twist pitch of each of the first twisted strands 213 of the inner conductor 210 of the power unit 200 may be set to be less than the second twist pitch of the multiply twisted conductor 215, thereby preventing the strands 211 or the first twisted strands 213 from loosening and achieving flexibility of the multiply twisted conductor 115.

In the embodiment of FIG. 3, an example in which each of the first twisted strands 213 of the inner conductor 210 of the power unit 200 consists of about 40 strands is illustrated, but the number of conductive strands constituting each of the first twisted strands 213 may be in a range of 30 to 50 and when the sum of areas of the strands 211 constituting the inner conductor 210 of each power unit 200 is in a range of 5 AWG to 7 AWG, each of the strands 211 may have a diameter of 31 AWG to 33 AWG. For example, the diameter of each of the strands 211 may be about 0.2 mm. A maximum DC voltage applied to an inner conductor configured as described above and an outer conductor described below may be about 600 V.

As shown in FIG. 3, the multiply twisted conductor 215 may include an inner insulating layer 230, and the inner insulating layer 230 may have a thickness of 0.6 mm to 1.5 mm, an inner diameter d1 of 4.8 mm to 6.0 mm, and an outer diameter d2 of 6.0 mm to 8.0 mm.

To minimize a total outer diameter of a cable while maintaining a shape of the multiply twisted conductor 215 of the inner conductor 210, a space factor of the strands 211 of the inner conductor 210 relative to an inner space of the inner insulating layer 230 may be set to 60% or more.

As described above, the inner conductor 210 has a (1+N) structure, e.g., a (1+6) structure in the embodiment of FIG. 3 in which seven first twisted strands 213 are provided, but the number of first twisted strands 213 may be variable.

An outer conductor 250 including a plurality of conductive strands 251 wound spirally about an outer side of the inner insulating layer 230 may be provided.

A method of spiral-winding a plurality of conductive strands or the like is generally used in the related art to form a metal shielding layer without applying a metal braided member but is used in the present disclosure to form a power conductor of the power unit 200 for supplying power rather than forming a shielding layer.

Figure 3B:
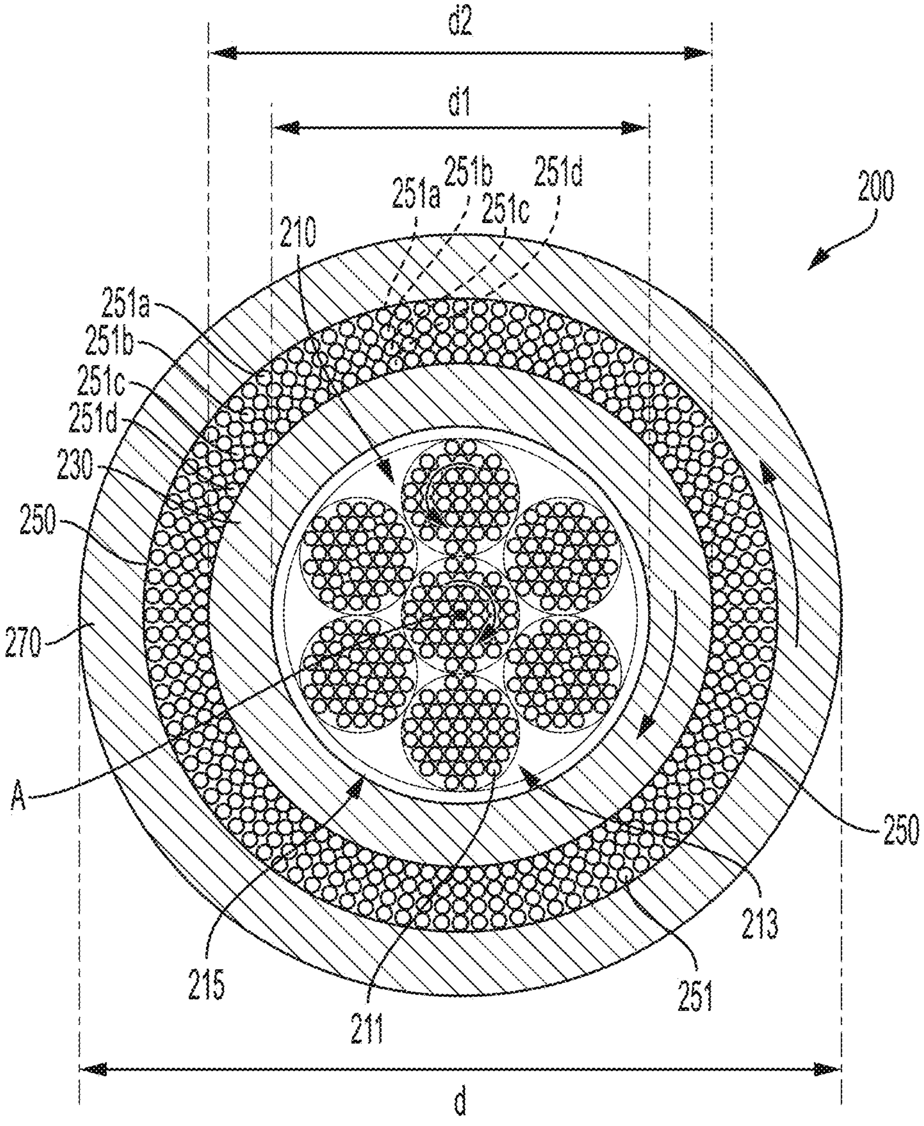

The outer conductor 250 may be formed by stacking a plurality of conductive strands while being wound spirally in one direction such that cross winding pitches of layers of the outer conductor 250 are reduced from inside to outside so as to prevent the strands of the layers from loosening, as is shown in the different cross-sectional views of FIGS. 3 and 3B with the pitches of the individual strands 251_a-d_ of the outer conductor 250 strand 251_d_ wound at a greater pitch than strand 251_c_, which is wound at a greater pitch than strand 251_b_, which is wound at a greater pitch than strand 251_a_.

The strands 251 of the outer conductor 250 may have a diameter of 31 AWG to 33 AWG, similar to the strands 211 of the inner conductor 210, and are formed in four layers as illustrated in FIG. 3 but may be formed in one to five layers, so that the sum of areas of the strands 251 of the outer conductor 250 may be equal to the sum of areas of the strands 211 of the inner conductor 210, which is in a range of 5 AWG to 7 AWG, and thus current carrying capability of the inner conductor 210 and current carrying capability of the outer conductor 250 may be substantially the same.

That is, a ratio between the sum of the areas of the strands 211 of the inner conductor 210 and the sum of the areas of the strands 251 of the outer conductor 251, which are used as a pair of conductors, may be set to 0.625:1.6 or to be substantially the same as 1:1, so as to stably supply DC power due to a balance between the current carrying capabilities.

A direction of spiral-winding the outer conductor 250 may be opposite to the direction (e.g., a Z-twist or S-twist direction) of helically winding the multiply twisted conductor so as to prevent the strands 211 and 251 of the inner conductor 210 and the outer conductor 250 from loosening, and achieve flexibility of the power unit 200.

As shown in FIG. 3, an outer insulating layer 270 may be provided outside the outer conductor 250. Similar to the inner insulating layer 230, the outer insulating layer 270 may be formed of a material such as PVC.

Similar, a thickness of the outer insulating layer 270 may be 0.6 mm to 1.5 mm and an outer diameter thereof, i.e., an outer diameter d of the power unit 200, may be 9.0 mm to 11.0 mm, thereby completing the power unit 200.

Figure 4:
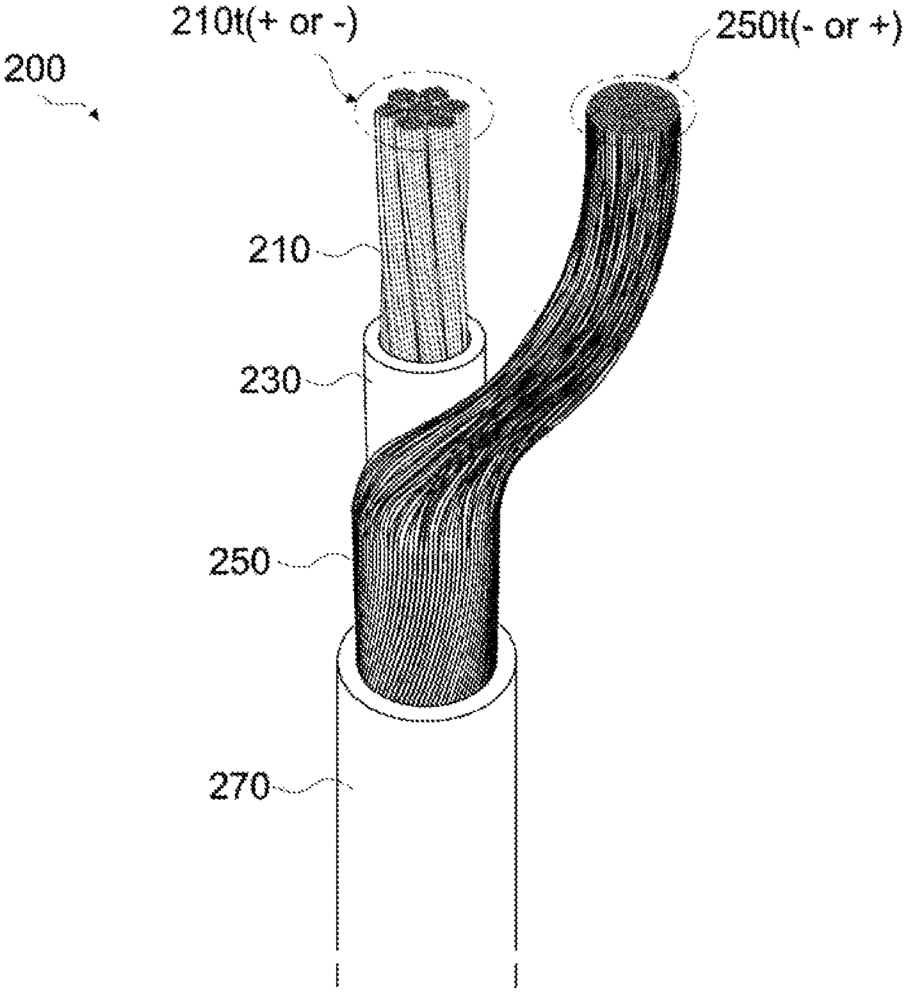
FIG. 4 illustrates a state in which insulating layers of the power unit of FIG. 3 are stripped to expose an inner conductor and an outer conductor so as to connect the power unit to a remote radio unit (RRU).

FIG. 4 illustrates a state in which insulating layers of the power unit 200 of FIG. 3 are stripped to expose the inner conductor 210 and the outer conductor 250 so as to connect the power unit 200 to an RRU.

According to the present disclosure, in order to prevent voltage oscillation due to a current change during the supply of power, a pair of conductors for supplying DC power to RRUs are manufactured in a coaxial structure so as to minimize electromagnetic induction due to a change of the intensity of current, thereby greatly reducing inductance.

When the power unit 200 is formed in the form of a general coaxial cable to merely reduce inductance, the inner conductor 210 may be configured as a cylindrical or pipe-shaped conductor and the outer conductor 250 may be configured by bending or joining a plate.

However, when the power unit 200 is formed in the form of a general coaxial cable as described above, it is very difficult to perform connection work at a base station tower.

Specifically, when power units 200 are formed in the form of a general coaxial cable, the power cable 2000 including the power units 200 should be stripped through a terminal box on a base station tower to expose the power units 200, and the power units 200 should be connected to RRUs by removing inner insulating layers and outer insulating layers from the power units 200, separating inner and outer conductors according to a positive pole and a negative pole, and processing the inner and outer conductors to be connected to connectors or connection terminals of the RRUs, whereas when inner conductors 210 are formed in the form of a cylindrical or pipe-shaped conductor or when outer conductors 250 are formed in the form of a joint pipe, these conductors should be processed by cutting, cutting off, forming or bending to connect end portions thereof to connectors or connection terminals of RRUs.

The inner conductor 210 may be used as a positive electrode of a DC voltage source and the outer conductor 250 may be used as a negative electrode of the DC voltage source. In this case, a cable shielding function may be provided by grounding the outer conductor 250 used as the negative electrode.

However, the level of difficulty of the above processing work is very higher than that of processing a flexible conductor by simply stripping an insulating layer, and the above processing work may not be capable of being performed with general cable work tools.

Therefore, as shown in FIG. 4, both the inner conductor 210 and the outer conductor 250 of the power unit 200 of the present disclosure are formed of fine strands, and thus, the inner conductor 210 is more flexible than a cylindrical conductor when the inner insulating layer 230 is removed therefrom and thus can be easily cut to adjust the length thereof, and the outer conductor 250 can be processed or finished by unwinding a bundle of conductive strands thereof in a direction opposite to a direction in which the bundle of conductive strands are wound by simply stripping the outer insulating layer 270 without cutting the outer conductor 250 with a cutting tool.

Therefore, as shown in FIG. 4, an end portion 210_t_ of the inner conductor 210 and an end portion 250_t_ of the outer conductor 250 of the power unit 200 of the present disclosure are in the form of a bundle of conductive strands and thus are connectable to a connector or connection terminal of an RRU, thereby greatly improving workability at a base station tower.

Although the outer conductor 250 of the present disclosure may be obtained by forming a braided layer of a plurality of strands rather than spiral-winding a plurality of strands, the braided layer should be cut to be processed in the form of a bundle of conductive strands of the outer conductor 250 shown in FIG. 4.

However, when the braided layer is used as a conductor for supplying power, a total cross-sectional area of part of the conductor to be connected may greatly decrease when the braided layer is partially cut, and it was confirmed that it is not desirable in terms of heating and conductor waste problems.

In addition, a method of configuring the inner conductor 210 and the outer conductor 250 as plate type conductors may be considered to reduce inductance of the power unit 200 but is not desirable because a round cable is difficult to form and a certain level of flexibility of the power cable 2000 connecting ground equipment of a base station to a terminal box or an RRU on a base station tower should be secured considering a cable laying process, etc.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A power unit comprising:

an inner conductor including a first plurality of conductive strands;

an inner insulating layer configured to insulate the inner conductor;

an outer conductor including a second plurality of conductive strands formed in multiple layers outside the inner insulating layer and wound spirally in a first direction; and an outer insulating layer configured to insulate the outer conductor, wherein:

the inner conductor and the outer conductor are formed coaxially to be used as a pair of conductors for supplying direct-current (DC) power, and a ratio between a first sum of areas of the first plurality of conductive strands and a second sum of areas of the second plurality of conductive strands is 0.625 to 1.6, the inner conductor of the power unit comprises a multiply twisted conductor manufactured by twisting a first subset of the first plurality of conductive strands in a second direction opposite the first direction to form a central twisted strand with a first twist pitch and twisting a plurality of second subsets of the first plurality of conductive strands in the first direction to form a plurality of outer twisted strands with the first twist pitch, and the plurality of the outer twisted strands is helically bound around the central twisted strand with a second twist pitch and in the second direction.

2. The power unit of claim 1, wherein the power unit is connected to a remote radio unit (RRU) deployed on a tower so as to supply power from a power supply unit (PSU) on the ground to the RRU in a base station system employing a remote radio head (RRH).

3. The power unit of claim 1, wherein the first twist pitch is less than the second twist pitch.

4. The power unit of claim 1, wherein each conductive strand of the central and outer twisted strands has a diameter of 31 AWG to 33 AWG, wherein the first plurality of twisted strands includes thirty to fifty conductive strands.

5. The power unit of claim 4, wherein the multiply twisted conductor has a (1+N) structure in which the central twisted strand is arranged at a center of the plurality of outer twisted strands, the plurality of outer twisted strands includes N outer twisted strands arranged around the central twisted strand and have an outer diameter of 5 AWG to 7 AWG, wherein N is 5, 6 or 7.

6. The power unit of claim 1, wherein each conductive strand of the second plurality of conductive strands has an outer diameter of 31 AWG to 33 AWG, and the outer conductor is formed in two to five layers that are each wound spirally in the first direction, wherein the sum of areas of the conductive strands of the second plurality of conductive strands is in a range of 5 AWG to 7 AWG.

7. The power unit of claim 6, wherein the outer conductor is formed by stacking the second plurality of conductive strands while being wound spirally in the first direction, wherein spiral-winding pitches of each layer of the two to five layers of the outer conductor decrease from inside to outside so as to prevent the conductive strands of the second plurality of conductive strands from loosening.

8. The power unit of claim 1, wherein the inner conductor is used as a positive electrode of a direct-current (DC) voltage source, and the outer conductor is used as a negative electrode of the DC voltage source.

9. The power unit of claim 1, wherein a space factor of the first plurality of conductive strands relative to an inner space of the inner insulating layer is 60% or more.

10. A power cable comprising:

a plurality of power units, each power unit comprising:

an inner conductor including a first plurality of conductive strands;

an inner insulating layer configured to insulate the inner conductor;

an outer conductor including a second plurality of conductive strands formed in multiple layers outside the inner insulating layer and wound spirally in a first direction; and an outer insulating layer configured to insulate the outer conductor, wherein:

the inner conductor is formed coaxially to the outer conductor, and a ratio between a first sum of areas of the first plurality of conductive strands and a second sum of areas of the second plurality of conductive strands of the outer conductor is 0.625 to 1.6, the inner conductor of each power unit comprises a multiply twisted conductor comprising a central twisted strand including at least two conductive strands of the first plurality of conductive strands twisted in a second direction opposite to the first direction at a first twist pitch and a plurality of outer twisted strands each comprising at least two conductive strands of the first plurality of conductive strands twisted in the first direction with a twist pitch, and the plurality of outer twisted strands are helically bound around the central twisted strand with a second twist pitch in the second direction; and a cable jacket covering the plurality of power units.

11. The power cable of claim 10, wherein the power cable supplies power to a plurality of remote radio units (RRU) deployed on a tower from a power supply unit (PSU) on the ground in a base station system employing a remote radio head (RRH).

12. The power cable of claim 11, wherein the power cable is connected to a terminal box from the PSU and is split into the plurality of power units through the terminal box to be connected to the plurality of RRUs.

13. The power cable of claim 10, further comprising at least one interposition unit.

14. The power cable of claim 10, further comprising a communication unit including at least one twisted pair of conductor lines insulated with an insulating layer.

15. The power cable of claim 10, further comprising an optical unit including at least one optical fiber.

16. The power cable of claim 10, further comprising at least one ripcord included in the cable jacket.

17. The power unit of claim 1, wherein every conductive strand of the second plurality of conductive strands is individually untwisted and is collectively wound around the inner insulating layer at a substantially equivalent angle with each other strand of the second plurality of conductive strands.

18. The power unit of claim 17, wherein the first direction is clockwise and the second direction is counterclockwise such that:

the at least two conductive strands of the first plurality of conductive strands that comprise the central twisted strand are wound counterclockwise, the at least two conductive strands of the first plurality of conductive strands that comprise each of the plurality of outer twisted strands are wound clockwise, the plurality of outer twisted strands are wound counterclockwise about the central twisted strand, and the second plurality of conductive strands are wound clockwise about the inner insulating layer, thereby describing an Z-S-Z-S pattern of winding in the power unit from a center outward.

19. The power unit of claim 17, wherein the first direction is counterclockwise and the second direction is clockwise such that:

the at least two conductive strands of the first plurality of conductive strands that comprise the central twisted strand are wound clockwise, the at least two conductive strands of the first plurality of conductive strands that comprise each of the plurality of outer twisted strands are wound counterclockwise, the plurality of outer twisted strands are wound clockwise about the central twisted strand, and the second plurality of conductive strands are wound counterclockwise about the inner insulating layer, thereby describing an S-Z-S-Z pattern of winding in the power unit from a center outward.

* * * * *